Patented Nov. 25, 1941

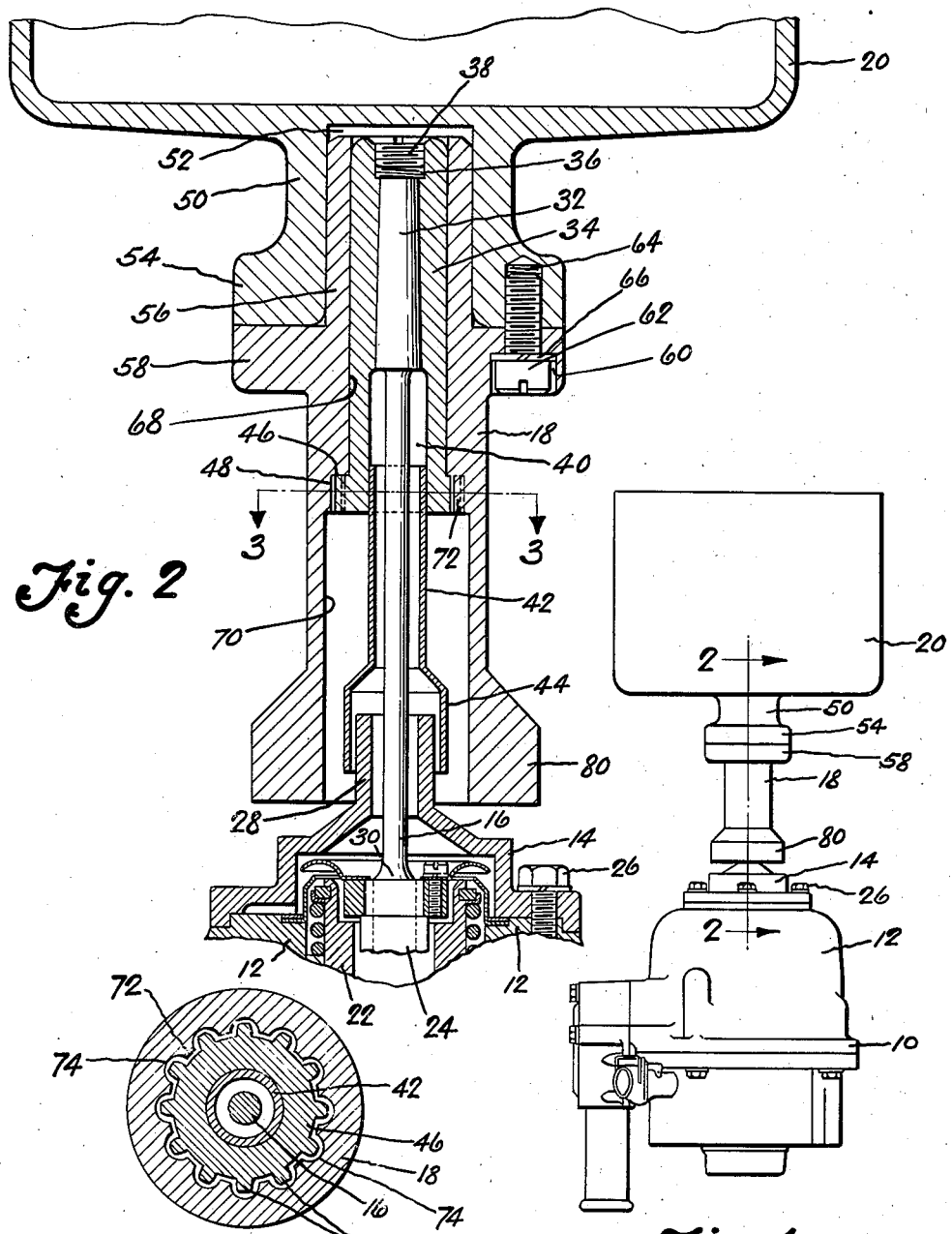

2,263,962

UNITED STATES PATENT OFFICE 2,263,962

SPINNER MOTOR COUPLING

Arthur G. Wise, Dayton, Ohio, assignor to General Motors Corporation, Detroit, Mich., a corporation of Delaware Application February 28, 1940, Serial No. 321,287

3 Claims. (Cl. 57—77)

This invention relates to textile spinners, such as used in the rayon industry, and has for an object to stabilize the rotation of a mass at the end of a relatively flexible but rigid shaft.

Another object of the invention is to provide a coupling means between a high speed motor shaft and a spinner bucket, which coupling means will be quickly separable to facilitate cleaning of the bucket and bucket compartment.

Another object of the invention is to improve a spinner motor and bucket assembly for regulating the distance between the geometric and dynamic centers of rotation, while at the same time permitting alignment of the dynamic center of rotation of the rotary mass with the motor bearings on the spin axis.

Another object of the invention is to provide a separate coupling between a spinner motor and its bucket that will not contribute to objectionable vibration of the assembly while in operation.

Another object of the invention is to provide a separable coupling between a spinner motor and its bucket, in which a sliding fit is effected between a pilot carried by the shaft and the bore of a stabilizer element, so that the bucket and stabilizer may be lifted from the shaft as a unit at any time.

A still further object of the invention is to provide means for driving a spinner bucket by a separable coupling that incorporates a gear cut integral with a pilot bushing and cooperable parts of a stabilizer assembly.

The foregoing objects are accomplished by providing the hub of the spinner bucket with a long sleeve, one end of which is dimensioned to closely fit the bore of the bucket hub, and to incorporate an intermediate flange through which clamping devices, such as cap screws, may operate to clamp the driving sleeve into rigid and substantially integral relation with a spinner bucket. The opposite end of the sleeve is extended substantially away from the flange in a direction opposite to the hub receiving portion, where the cross section of the sleeve is increased to provide a substantial mass operating as an inertia member, which in the final assembly is located in close proximity to the motor housing. The interior of the sleeve at a point between the inertia mass and the clamping flange is provided with gear cuttings adapted to nonrotatably engage toothed extensions arranged perimetric of a flange carried by a bushing, which bushing has an easy slidable fit lineally of the sleeve. Relatively permanent driving engagement is effected between the bushing and motor shaft by means of the gear cuttings and toothed extensions, which create an assembly susceptible of continued driving engagement when the bucket is mounted over the shaft, but also susceptible of easy and instantaneous detachable connection between the bucket and shaft assembly.

Further objects and advantages of the present invention will be apparent from the following description, reference being had to the accompanying drawing wherein a preferred embodiment of the present invention is clearly shown.

In the drawing:

Fig. 1 is an elevational view of a spinner motor and bucket assembly, incorporating the instant invention.

Fig. 2 is a vertical sectional view of a coupling means between the same, substantially as indicated by the line and arrows 2—2 of Fig. 1.

Fig. 3 is a transverse sectional view through the geared driving relation, substantially as indicated by the line and arrows 3—3 of Fig. 2.

In the textile industry, spinner motors of the flexible shaft type are usually fitted at the top of the shaft with a comparatively long cylindrical counterweight, the mass of which combined with the bucket weight regulates the distance between the geometric and dynamic centers of rotation. The shape of the counterweight and other elements permits the shaft, the cross section of which is usually in the order of $\frac{1}{4}''$ diameter to bend slightly so that the dynamic center of the rotating mass may align itself with the axis of the motor bearings.

Due to the fact that the rayon bucket must be unloaded every few hours, it is customary to have a clearance of from .001 to .006'' between the hub bucket and the pilot of the stabilizer. The smaller value represents the preferable clearance but due to wear the clearance increases to the larger or even greater value. It has been found that this clearance between the bucket hub and stabilizer is the seat of a vibration originating from shocks of various kind incident to operation of the motor and bucket assembly during the manufacture of yarn and that the severity of vibration is in direct proportion to the clearance. It has also been ascertained that this vibration may be eliminated if the stabilizer is attached rigidly to the bucket such as to effect a substantial integral formation or the like. It would be impractical to permanently attach the bucket to the motor shaft, since it is necessary to frequently wash both the bucket and the spinner compartment enclosing it of adhering crystalline formations, which accumulate thereon during the course of operation.

The improved construction disclosed herein that eliminate the objectionable features stated, and accomplishes an efficient and complete solution of the problems, incorporates as depicted in the drawing, an electric motor 10 having an upper case member 12 substantially closed by an end cap 14 extending along a shaft 16, to have driving engagement with a sleeve member 18 more or less permanently united with a rayon or spinner bucket 20. The motor 10 is of the high speed type, and operates through the shaft 16 which though comparatively rigid is yet relatively flexible, and operates through its driving connection with the bucket 20 to rotate the same at an extremely high speed, for the purpose of twisting the textile thread fed into the bucket and for the further purpose of laying the thread against the inside surface of the rising side walls of the bucket, as a continuous filament.

Further, as respects the motor specifically, it is usual for the casing member 12 to provide a depending sleeve or tubular portion 22 that carries a single anti-friction bearing for support of the rotor of the motor, the rotor being customarily mounted on the comparatively rigid shaft element 24 rotatable with the sleeve element 22, and drivingly united with one end of the shaft 16 by means of the usual taper, or other union as is well known to those experienced in the art. It is also well known by those experienced in the art that the rigid shaft element 24 is to some extent, susceptible of a slight wobble or oscillation within the bore of the sleeve element 22, that wobble or oscillation being eliminated so far as practicable by damping means situated at the remote end of the shaft element 24 on the opposite side of the anti-friction bearing from the shaft extension 16, all of which is well known to those experienced in the art.

The end cap 14 is secured to the housing member 12 by cap screws or the like 26, and provides a tubular extension 28 having an internal bore sufficiently large to pass the enlarged end portion 30 of the shaft, in making the tapered or like union with the rigid shaft element 24. The extending or protruding portion 28 of the housing surrounds the shaft 16 in spaced relation, but leaves a considerable portion of the shaft 16 protruding from the bore thereof. All of the motor structure per se that has been thus far described, is not new but is well known to those experienced in the art, and in itself forms no part of this invention.

The extending end of the shaft 16 is enlarged to provide a relatively free end portion 32, that is provided with a slight taper increasing from the terminal end back toward the motor. In firm and positive driving engagement with the shaft portion 32 there is a pilot bushing 34, having a taper bore adapted to bindingly receive the taper portion 32 of the shaft 16. At the top end of the bushing 34 there is provided in alignment with the taper bore, a threaded recess 36 adapted to receive a screw plug 38, which seals the union between the shaft and bushing against the lodgement of foreign matter, and also provides a means for pulling the bushing from the shaft, through the substitution of an appropriate puller plug or screw member for the screw 38, which when run to extreme depth will engage the end of the shaft portion 32, and operate to withdraw the bushing 34 from the shaft when it is desired. The lower or opposite end of the bushing 34 provides an enlarged bore 40, which allows for free passage of the taper portion 32 therethrough and permits bending or flexing of the slim portion of the shaft between the enlarged portions 30 and 32. Within the enlarged bore 40 of the bushing there is secured a sleeve element 42 that is concentrically arranged about the shaft 16 and extends along the same toward the motor to end, and where it is flared outwardly at 44 to surround in spaced relation the protuberance 28 of the end cap 14. The minimum bore dimension of the sleeve element 42 is sufficiently great to pass freely the largest cross sections of the shaft 16 such as at 30 and 32. The skirt portion 44 is in substantially overlapping relation with said protuberance 28, and acts to shed off and deflect matter from entering the housing through the bore of the protuberance 28 should the shaft extension be washed down.

At the extreme lower end of the bushing 34 a flange portion 46 is provided that is fashioned to provide circumferential equally spaced tooth members 48 adapted to contribute to a positive driving relation between the motor and the spinner bucket, as will presently be described.

The spinner bucket 20 as is usual, has a hub portion 50 with a central bore 52 entering from a clamping flange 54, all of which are concentric with one another and with the axis of rotation of the bucket 20. The sleeve member 18 contributing to the invention herein provides a pilot portion 56 adapted to closely fit within the bore 52 of the bucket hub, while the flange 54 of the bucket seats against a flange 58 of the sleeve and is counterbored at 60 to receive clamping devices, as clamp screws 62, that are threaded into apertures 64 of the bucket flange 54. The spring lock washers 66 assist to unite the sleeve 18 and bucket 20 in a very rigid and rather permanent relation, such as to partake of a substantial integral union of the two.

The sleeve 18 is provided with a centralized and stepped bore, including a smaller portion 68 adapted to have a sliding fit with the outer surface of the bushing 34, and including an enlarged portion 70 adapted to freely pass the bushing 34 and its flanged portion herein before referred to. At the shoulder 72, which is the juncture of the small bore 68 and the large bore 70 of the sleeve 18, a plurality of cutouts 74 equal in number and spacing, are provided for reception of the tooth elements 48 provided by the flange 46 of the bushing 34. When those elements are in interengaging relation they provide a positive driving relation, of the geared type, between the motor shaft and bucket 20, in that the bushing 34 and sleeve 18 are incapable of relative angular movement, but are effectively coupled together by a lineal sliding relation, such as to make removal of the bucket assembly from the motor drive, substantially instantaneous and without the necessity of working lock and screw devices.

It will be noted that the geared connection between the bushing 34 and sleeve 18 is situated substantially midway of the length of the sleeve, the said sleeve 18 depending a substantial distance therebelow and coextensive with the larger bore 70, to end in an enlarged and thickened flange 80, surrounding in overlapping and spaced relation the elements 28 and 44, which being located close to the housing and on the remote side of the driving connection from the mass of the bucket 20, provides an effective cylindrical counterweight. The diameter of the weight member is kept small so as to reduce the windage loss and so as to decrease the moment of inertia about the vertical axis, whereby the motor will start and stop more quickly than in the instance of the moment of inertia about the axis being greater. The center of mass of the weight member is preferably spaced a considerable distance from the bottom of the bucket, because that improves the effectiveness of the weight member in producing stable rotation of the bucket. The weight member that hangs from the top of the flexible shaft acts as a stabilizer, in that it provides a gyroscopic action that stabilizes the bucket and tends to prevent oscillatory movement of the bucket.

While the embodiment of the present invention as herein disclosed, constitutes a preferred form, it is to be understood that other forms might be adopted, all coming within the scope of the claims which follow.

What is claimed is as follows:

1. In a spinner motor having a vertically arranged relatively flexible shaft extending from a motor housing and adapted to drive a spinner bucket, the combination comprising, a pilot bushing carried by the extending end of said shaft and having a flange at its low end, a sleeve engaging the bushing with a free fit, and being counterbored to receive said bushing flange, means securing the sleeve in rigid driving relation with the bucket, including a cylindrical portion received by the hub of the bucket and a flange intermediate the ends of the sleeve through which clamping devices engage the hub of the bucket and means including the flange of said bushing and the shoulder at the counterbore of said sleeve providing a positive driving relation between the motor shaft and the bucket.

2. A spinner motor assembly, comprising in combination, a vertically arranged relatively flexible shaft extending from a motor housing, said housing having a protruding portion extending a short distance along the shaft, said shaft having its free end provided with a slight taper, a pilot bushing in driving relation with said shaft at the said taper, said pilot bushing having an increased bore at the larger end of the taper, and a tubular member press-fitted therein and extending along the shaft away from the bushing to surround the housing protrusion, whereby liquid material used in washing down of the spinning box compartment while the bucket assembly is removed will be prevented from entering the motor housing.

3. A spinner motor assembly, comprising in combination, a vertically arranged relatively flexible shaft extending from a motor housing, said housing having a protruding portion extending a short distance along the shaft, said shaft having its free end provided with a slight taper, a pilot bushing in driving relation with said shaft at the said taper, said pilot bushing at the small end of the shaft taper being provided with a screw plug, whereby foreign matter is prevented from entering the taper connection between the shaft and bushing, and whereby provision is made for forceably pulling the bushing from the taper of the shaft, when so desired.

ARTHUR G. WISE.